(12) United States Patent
Wäscher et al.

(10) Patent No.: US 7,563,312 B2
(45) Date of Patent: Jul. 21, 2009

(54) AEROSOL SEPARATOR

(75) Inventors: Thomas Wäscher, Heidelberg (DE); Ralf Arheidt, Karlsruhe (DE); Werner Baumann, Karlsruhe (DE); Adrei Bologa, Stutensee (DE); Hanns-Rudolf Paur, Karlsruhe (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 557 days.

(21) Appl. No.: 11/155,754

(22) Filed: Jun. 17, 2005

(65) Prior Publication Data

US 2005/0241485 A1   Nov. 3, 2005

Related U.S. Application Data

(63) Continuation-in-part of application No. PCT/EP03/09455, filed on Aug. 27, 2003.

(30) Foreign Application Priority Data

Dec. 19, 2002   (DE) ................. 102 59 410

(51) Int. Cl.
     *B01D 47/00*   (2006.01)
(52) U.S. Cl. ............................. 96/274; 96/299
(58) Field of Classification Search ............ 96/299, 96/274, 290, 296–297, 322, 326; 95/210, 95/213, 214, 216, 211
See application file for complete search history.

(56) References Cited

U.S. PATENT DOCUMENTS

| | | | | |
|---|---|---|---|---|
| 2,986,278 A | * | 5/1961 | Bjorklund | .................... 55/348 |
| 3,495,384 A | * | 2/1970 | Howard | ........................ 96/326 |
| 3,760,567 A | * | 9/1973 | Stalker | ........................ 96/282 |
| 4,280,825 A | * | 7/1981 | Marjollet et al. | .............. 55/347 |
| 5,123,936 A | * | 6/1992 | Stone et al. | ..................... 95/65 |
| 6,174,339 B1 | * | 1/2001 | Varady | ......................... 55/348 |
| 6,858,064 B2 | * | 2/2005 | Bologa et al. | ................... 95/65 |
| 7,101,424 B2 | * | 9/2006 | Wascher et al. | ................. 96/88 |

FOREIGN PATENT DOCUMENTS

| | | |
|---|---|---|
| CA | 885301 | 11/1971 |
| DE | 101 32 582 | 8/2002 |
| GB | 334 660 | 9/1930 |

* cited by examiner

*Primary Examiner*—Duane Smith
*Assistant Examiner*—Paul Durand
(74) *Attorney, Agent, or Firm*—Klaus J. Bach

(57) ABSTRACT

In an aerosol separator for removing dust particle and droplet aerosols from a flow of contaminated gases, comprising an essentially vertical channel section through which the contaminated gas (exhaust gas) is conducted upwardly, and into which an easily vaporizable liquid is sprayed, in finely divided droplets, a densely packed tube bundle of essentially identical straight tubes consisting of a process-suitable inert material is arranged supported on a perforated conical support structure such that moisture contained in the gas flow is deposited on the inner and outer tube surfaces and flows downwardly counter to the gas flow through the tube bundle and is collected in a gutter mounted to the inner wall of the tube bundle at the bottom end thereof for conducting the condensed liquid together with the contamination of the gas out of the aerosol separator.

11 Claims, 2 Drawing Sheets

AEROSOL SEPARATOR

This is a Continuation-In-Part Application of International Application PCT/EP2003/009455 filed Aug. 27, 2003 and claiming the priority of German application 102 59 410.4 filed Dec. 19, 2002.

BACKGROUND OF THE INVENTION

The invention resides in an aerosol separator by which dust and droplet aerosols can generally be removed from gases and can particularly be removed in gas purification plants.

Such apparatus have a very wide field of uses where warm and humid gases are generated from stationary and mobile sources such as motor vehicles, ships, power plants, heating plants, waste combustion plants, fossil fuel plants and chemical plants, etc.

A plant with electrostatic equipment for cleaning gases carrying liquid or solid particles is known from DE 101 32 582. This plant includes three sections:

An ionization and main purification section for the water-saturated raw gas from a space charge zone following the device for the ionization of the contamination particles, an auxiliary cleaning section comprising a zone of grounded hollow electrodes, and a final filter arrangement for the fine purification of the gas after which the purified gas is released to the environment.

The particles are ionized in corona discharge. Particles separated in the three zones are collected, cleaned and again returned to the gas cleaning process. The coolant heated during passing through the spaces between the tubes can be used for heating the blocking gases for the isolation of the support structures and, as a result, of the high voltage penetrations.

It is the object of the present invention to separate liquid and solid coarse and fine particles, without the normally required high differential pressure from gases, with a separation efficiency >90%, and to continuously discharge them.

SUMMARY OF THE INVENTION

In an aerosol separator for removing dust particle and droplet aerosols from a flow of contaminated gases, comprising an essentially vertical channel section through which the contaminated gas (exhaust gas) is conducted upwardly, and into which an easily vaporizable liquid is sprayed, in finely divided droplets, a densely packed tube bundle of essentially identical straight tubes consisting of a process-suitable inert material is arranged supported on a perforated conical support structure such that moisture contained in the gas flow is deposited on the inner and outer tube surfaces and flows downwardly counter to the gas flow through the tube bundle and is collected in a gutter mounted to the inner wall of the tube bundle at the bottom end thereof for conducting the condensed liquid together with the contamination of the gas out of the aerosol separator.

In the gas flow direction the aerosol separator first includes an injection zone extending over the flow channel cross-section or several such injection zones arranged axially in series each having an injection nozzle in the channel wall or several injection nozzles distributed uniformly over the circumference in a particular cross-sectional plane.

The mostly warm and humid exhaust gases for example from stationary or mobile internal combustion engines or combustion plants for fossil fuels and/or waste materials for example from an $SO_2$ absorption washing column and a coarse droplet separator are super-saturated homogeneously by the injection of a colder liquid in a shock-like manner. In the injection zones, a droplet spray of a liquid which is suitable for the process and which easily vaporizes is added so that the gas enters the super saturated range. In order for this to be effective, the injection axis of an injection nozzle is inclined so as to direct the spray against the flow of the exhaust gas. The adjustment of the nozzles depends on the types of nozzles used and the particular test being performed.

Subsequently, the supersaturated gas or exhaust gas flows upwardly through a steeply inclined or even vertical channel section which consists of a multitude of individual tubes. This section comprises a bundle of tightly packed essentially identical straight tubes or an annular bundle of tubes with a large open flow cross-section for packing a relatively large number of tubes around the flow channel axis. For construction-static reasons this could be a good mechanical solution for large tube bundles for the set-up of the zone. The tube packet or tube bundle fills the whole open cross-section of the channel. It is supported on a support surface which, in the flow direction, is curved concavely and connected to a channel surface wherein all the tubes of the packet are supported on this surface. The channel axis extends vertically or at least so steep that the support surface is always inclined downwardly from the channel axis toward the channel wall.

The diameter of the tubes is so selected that the resulting Reynolds number of the tube packet $R_w = w \times D/v < 2000$. (Herein are: D the open tube diameter of the individual tubes in m, w the gas speed in m/s and v, the gas viscosity during operation in $m^2/s$). The length of the tubes is at least five times the diameter D of the tubes.

The individual tubes are arranged in the most simple case irregularly but tightly together in the bundle or packet. The raw gas flows through the tube bundle through the interior of the tubes and along the outside of the tubes.

The aerosol droplets deposited on the tube walls in the tube bundle from the saturated raw or exhaust gas flows, under the gravity force in countercurrent with the gas to be purified, toward the bottom end of the tube bundle and would drop back, in large droplets, into the column. This however is prevented by the perforated support surface whose perforations have an open cross-section of such a shape that the tubes cannot fall through the perforations. The aerosol flowing from the tubes is conducted along the support surface to a gutter. The gutter is arranged between the injection zone and the end of the support surface along the inner wall of the tube. It extends along the inner wall of the tube channel completely around the channel and collects the condensate flowing from the support surface. The gutter has at least one discharge opening extending through the channel wall through which the collected condensate is drained.

Certain features increase the purification effect depending on the raw gas.

For example, the tubes of the tube bundle may be smooth or corrugated like a corrugated hose or they may be thread-like shaped. They consist of a dielectric material or a metallic material. The dielectric material may be glass, plastic, ceramic, or, in the second case, it may be steel, particularly stainless steel or copper tubes or coated tubes having a surface coating suitable for a particular process so that the surface is inert with respect to the process atmosphere. The surface coating may also be applied to dielectric tubes. Generally, the smooth or corrugated tubes may be commercially available DIN standard tubes. Particular consideration must be given only to a problematic/aggressive atmosphere as far as durability is concerned. However, this does not concern the shape of the tubes.

The—as seen in the flow direction—concave shape of the support surface is inclined from the center toward the channel wall to such an extent that the aerosol exiting at the lower end of the tube bundle flows from the support wall onto the channel wall. The geometric shape of the support structure is in its most simple form a hollow pyramid or a hollow cone since these shapes can be manufactured from sheet material in a simple manner. The more acute the opening angle is the better remains the aerosol, which has been removed from the gas, attached to the support surface. On the other hand, a requirement for a compact size of the aerosol separator requires a small height of the tube bundle. But in any case, the opening angle must be less than 180°. Experiments with different aerosols and different arrangements of the support surface have shown that opening angle α should be between 70 and 100° for an efficient and economical design (Only if a down dripping of the aerosol is acceptable could the tube bundle have an α>180°).

The support surface is constructed from a perforated sheet. The perforations may have any open cross-section, they may be in the form of squares, they may be circular, polygonal or oval. If the perforations are elongated, it is advantageous if the longitudinal axis extends along a local surface line or in the direction of the inclination gradient. In any case, the shape of the perforation is such that no pipe can slide out of the tube bundle through a perforation opening in the support structure.

Instead of a perforated metal sheet, a grid structure with uniform meshes is suitable or a grid with wires extending along a surface line or a generatrix, which wires are kept in place by solidly connected circumferentially extending wires. For an aerosol flow along the support area, the circumferential wires are preferably arranged on the downstream side of the support structure with regard to the gas flow through the tube bundle. Also in this case, the grid openings must be small enough so that no tube can slide out of the tube bundle. If a grid structure is provided as support area, the meshes are so arranged that the circumferential wall areas of the meshes do not extend horizontally.

For flushing the tube bundle or for a supportive wetting of the tube bundle upstream in the gas flow direction a further spray plane is provided which comprises a tube extending normally from the channel wall and having at its end a river delta-like branching or an annular tube arranged concentrically with the tube bundle axis. At the ends of the tube branches or the ring, spray nozzles are provided for the uniform spraying at the convex front end of the tube bundle. The upper and lower spray procedure may be continuous or may be initiated as needed and can be continuous or in intervals in a coupled or uncoupled way.

The aerosol collected in the gutter mounted to the inner wall of the channel must be discharged rapidly and reliably. Depending on the volume collected, one of several discharge passages extend through the wall of the channel and they are arranged always at the lowest location of the respective collection area.

If the channel cross-section is large so that the tube bundle cannot easily be transported as a whole it is expedient for the assembly and for the servicing if the tube bundle consists of sectors or segments 11 that is it is supplied originally in sections and is then assembled or, respectively, disassembled for servicing and then reassembled. In this embodiment, it is expedient to provide a central support structure with an annular tube bundle.

The aerosol separator has no ionization stage. With the omission of the high-voltage circuitry and the blocking gas supply, its design is therefore simplified. No electrical parts are needed. Instead, an over-saturation stage consisting of one or several single compound full-cone nozzles to which a cold liquid is supplied, are installed. For the removal of the moisture, a liquid corresponding to the type of moisture content is sprayed into the moist gas. In connection with organic liquids, similar liquid mixtures may be used or only thinners or solvents may be used. The liquid injectors consist for simplicity reasons—depending on the size of the channel—of one or several single-compound full cone nozzles, which are so operated that the raw gas is fully over-saturated before it reaches the separator. Also, other types of nozzles may be used if the raw gas can be over saturated by them equally well.

The aerosol separator is simple in its design and, therefore, is relatively inexpensive. Also, its energy consumption is relatively low because of the omission of the ionization stage.

Further advantages are a low pressure loss, a good cleaning and a high separation effectiveness. The description of the aerosol separator and its operation concerns the separation of liquid fogs of low viscosity and also of a viscosity higher than water and also for liquid fogs with a vapor pressure that is higher or lower than that of water such as alcohol or oil fogs.

Below an embodiment of the invention will be described in greater detail with reference to the accompanying drawings.

DESCRIPTION OF A PARTICULAR EMBODIMENT

The effect that, with a cold water pre-injection, a mass aerosol total separation degree of at least 95% can be achieved was measured for the first time in an existing plant.

The unit is already installed and is in experimental use but is for practical purposes a prototype. It includes an ionization stage, which can be eliminated by switching off the high voltage so that only the tube bundle separator is effective.

The water pre-injection was installed because it had been observed that the exhaust gas, after passing through the washing column, and although being practically in thermal equilibrium with the wash water, reached the ionization stage of the apparatus still in a dry state. However, the apparatus is a wet electro-filter system which is so designed that the removed droplet aerosol can freely flow off as condensate. The pre-injection of water had the immediate effect of increasing the separation degree, which in the dry/half wet state was at 90%, to >95% without the use of a high voltage.

Figure 1:
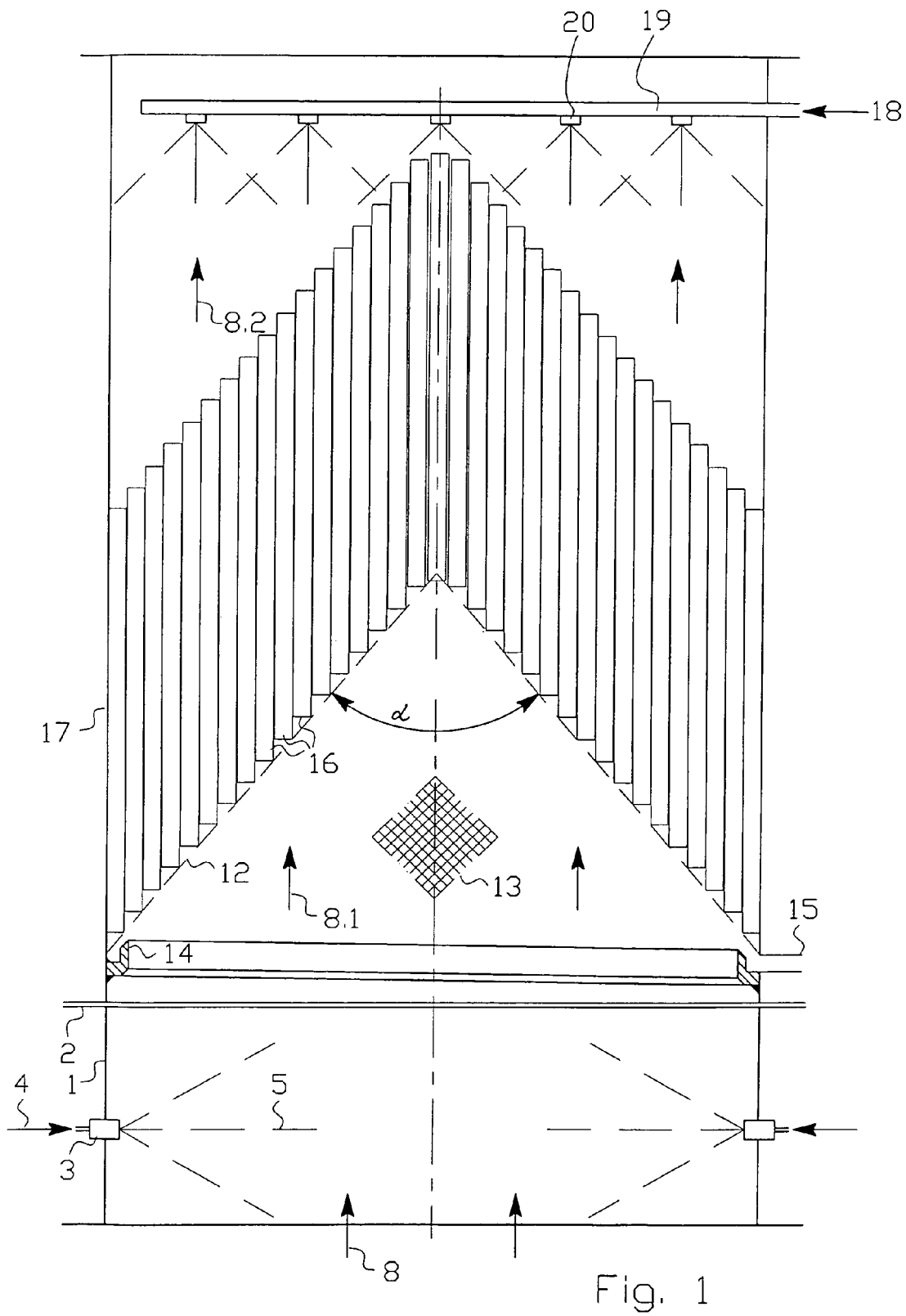
FIG. 1 shows, in a cross-sectional view, an aerosol separator with a gas flow channel of circular cross-section

Description of FIG. 1 on the basis of an example with an aqueous fog:

The gas 8 from which the aerosol has to be removed flows upwardly into the vertical channel section 1. Here, droplets 5 of easily vaporizable liquid 4, in this case water, is added to the gas so that the gas becomes over-saturated. The liquid 4 is sprayed into the gas by nozzles 3, which are mounted into the channel wall and spray inwardly. For a sufficient mixing of the spray with the gas, it is advantageous to arrange the spray plane horizontally as shown or more or less inclined downwardly. If the gas from which the aerosol is to be removed is already warmed up and moist and close to saturation, the relative short channel section 1 of a size in the order of the channel width or the channel diameter is sufficient for the over-saturation of the gases. The injected liquid has preferably a lower temperature than the gas. If necessary, several spray levels, one on top of the other are provided. If the gas from which the aerosol is to be removed is still relatively dry, it may be necessary to provide for a steam introduction ahead of the nozzle plane or planes.

The water super-saturated wet gas which is still laden with aerosol flows subsequently upwardly into the channel section 17 where it reaches the pyramid or cone-shaped gas permeable support surface 12, 13 in form of the grid 12 which projects upwardly in its center. The rods of the grid 12 are preferably inclined so as to extend at an angle of about 45 degrees to a horizontal plane so that the meshes are always inclined. The cone or pyramid angle α is greater than 70° preferably in the present apparatus between 80 and 100°. In this way, the aerosol removed from the grid flows off attached to the grid and the height of the tube bundle remains relatively low.

The over-saturated exhaust gas 8.1 flows vertically upwardly through the grid 12 on which the plurality of straight individual tubes 16 are supported. The diameter of the individual tubes is so selected that the resulting Reynolds number $R_e$ of the tube bundle remains preferably below 1600. The length of the individual tubes is at least 5×D, preferably 10 to 30×D.

The aerosol droplets deposited on the inside and outside surfaces of the individual tubes flow as a result of gravity downwardly in counter current to the gas toward the lower end of the tubes and is conducted by gravity along the inclined grid toward the channel wall. At the inner channel, a circumferentially extending gutter 14 for example of a rectangularly profiled material is arranged on which the grid structure is supported. The gutter 14 is inclined slightly with respect to a horizontal plane toward a discharge opening 15 so that the condensate and aerosol flowing off the grid 12 is discharged at the lowest point of the gutter through the discharge opening 15 disposed at this point.

The gas 8.2 from which the aerosol has been removed exits the tube bundle at the top of additional apparatus such as a heat exchanger a blower etc., into the environment.

For the case, that at times, dry gas conditions occur and/or the droplet aerosol does not flow out by itself but accumulates in the tube bundle, outside the tube bundle that is downstream thereof another spray plane (19, 20) is provided with a horizontal delivery pipe 19. The liquid 18 sprayed from the nozzles 20 can be directed for short periods or continuously uniformly at the flow discharge end of the tube bundle 16 for removing any aerosol accumulation from the tube bundle. Also, this wash water flows down onto the grid 12 and into the gutter 14 and is discharged from there through the discharge opening 15.

In the present example, an almost water saturated but still dry stack gas is conducted upwardly through a channel cross-section of 740×740 mm in an amount of 1500 Bm³/h at a temperature of about 52° C. Below, there is the round connecting channel to which on the side a full cone single compound injection nozzle 5 is mounted. This nozzle is connected to a water supply line and spray-discharges 60 l/h water of 20° C. into the gas 8 which enters the square channel section so that the gas 8 is super-saturated and wet. At a level of 250 mm above the entrance to the square channel section the collection gutter 14 with square cross-section is arranged inclined at a 2.5° angle at the inner channel wall 17. On the collection gutter 14, the pyramid-shaped grid 12 is supported. It has an opening angle of α=100° and a grid mesh pitch of 10 mm. On the grid 12 about 1500 individual tubes with an inside diameter of 16 mm and an outside diameter of 20 mm are supported. Because of the low thermal load cable protection pipes of PE as they are used in electrical installations as conductor and cable protection pipes in accordance with VDF standards DIN EN 50086 in the form of corrugated tubes with a wave spread (distance between the corrugations) of about 35 mm have been used in this case. The tubes have a length of 500 mm. Smooth PE tubes or smooth steel protection tubes as used in electrical installations may also be used but it has to be considered on a case by case basis whether they can withstand a particular process atmosphere and the flushing liquid for extended periods.

Figure 2:
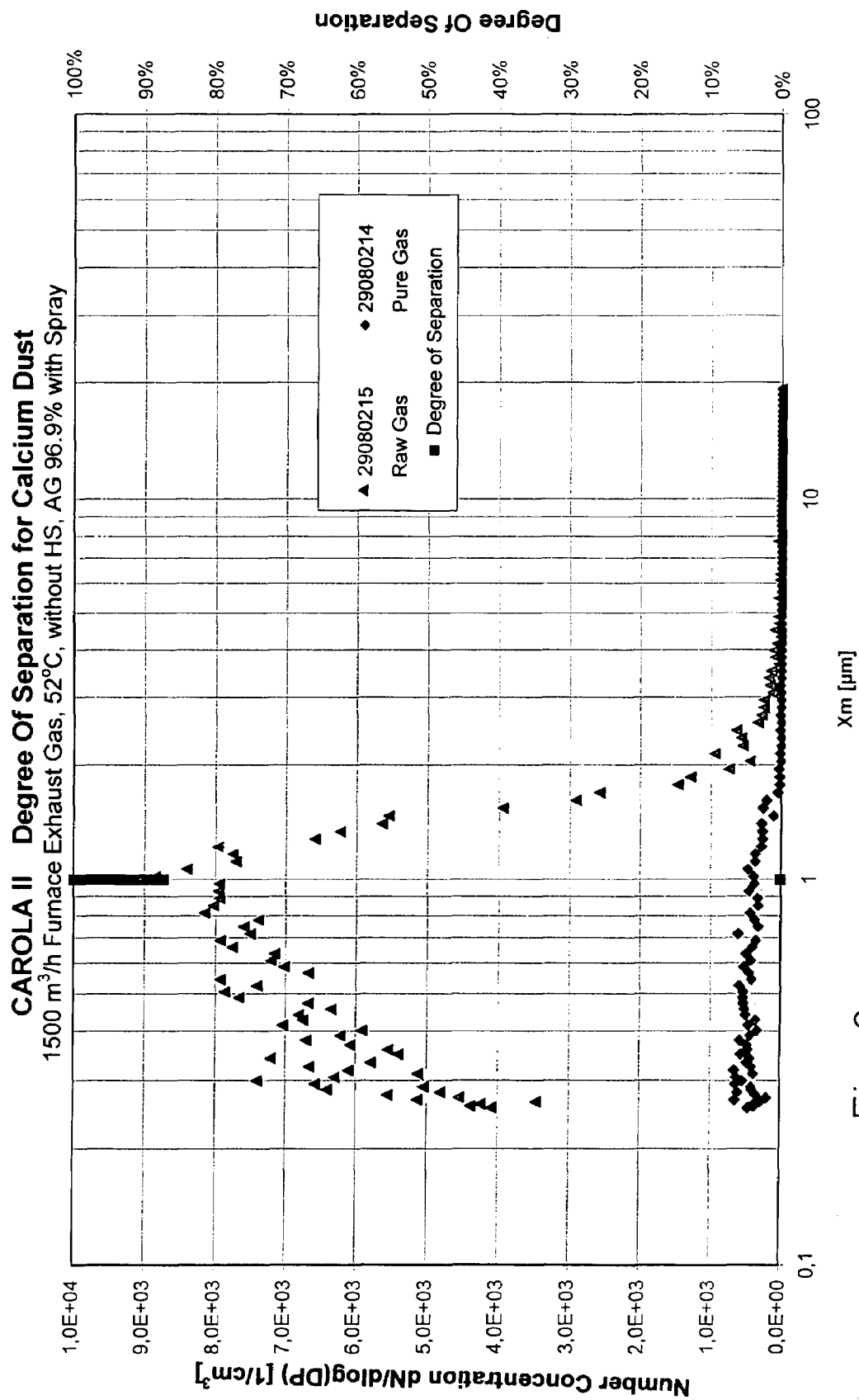
FIG. 2 shows the separation efficiency of a separator for calcium dust for example.

The gas was charged with lime dust. The optical dust measurement showed a raw gas value of 28.4 mg Bm₃ with particles in the size range of 0.3 to 20 μm. The purified gas was measured with the same optical measuring instrument after leaving the separator and was formed to have a pure gas value of 0.9 mg/m³ in the same particle size range. The separation degree curve is shown in FIG. 2. The data given in the diagram indicate an average mass separation degree of 96.8%. The triangular points show the raw gas conditions, the reaction points show the pure gas state, the square points show the separation degree.

In the example shown, the moisturizing liquid is water. Solvents such as gasoline, low alcohols, low viscosity oils and paint solvents may be used depending on the raw gas contamination if dangerous conditions such as explosions or poisoning can be controlled with justifiable financial expenses.

What is claimed is:

1. An aerosol separator comprising:
   a channel section with an essentially upright vertical axis, in which an aerosol separation structure is arranged into which an exhaust gas is conducted from the bottom end thereof,
   at least one injection nozzle zone extending over the channel cross-section and having injection nozzles mounted in the channel wall in a circumferentially uniformly spaced relationship disposed in a particular cross-sectional plane, for the addition of an easily vaporizing liquid to the exhaust or raw gas whereby the gas becomes oversaturated, each spray nozzle being so arranged that the respective spray axis is inclined at an angle toward the on-flowing gas,
   a bundle of tightly packed same type straight tubes arranged in a subsequent downstream channel section so as to extend over the whole channel cross-section and consisting of a process-appropriate inert material, the tubes being supported on a perforated tube support structure which, from a channel center point, extends downwardly to the channel side walls so as to form a cone or pyramid like tube bundle arrangement, the diameter of the tubes being so selected that the Reynolds number of the tube bundle is $$R_e = w \times D/v < 2000$$

and the length of a tube is at least five times the tube diameter D,
   a gutter extending circumferentially at the inner wall of the channel below the tube support structure for collecting condensate deposited on the tube surfaces and running down along the support structure toward the channel wall, the gutter having a discharge opening extending through the channel wall.

2. An aerosol separator according to claim 1, wherein the tubes in the tube bundle have smooth tube surfaces.

3. An aerosol separator according to claim 1, wherein the tubes in the tube bundle are corrugated with circular or threadlike corrugations.

4. An aerosol separator according to claim 1, wherein the tubes consist of one of a dielectric and a metallic material.

5. An aerosol separator according to claim 4, wherein the support structure is pyramid or cone-shaped, the cone having a cone angle of 70°<α<100°.

6. An aerosol separator according to claim 5, wherein the tube support structure is a perforated metal sheet having elongated perforations with a longitudinal extension in the direction of a generatrix of the tube support structure.

7. An aerosol separator according to claim 5, wherein the tube support structure consists of a grid with regular meshes having mesh wires extending not horizontally.

8. An aerosol separator according to claim 7, wherein the support structure comprises a grid with straight wire sections which extend from the top of the conical support structure to the walls of the passage and which are joined by mesh wires extending continuously around the conical structure and being connected to the straight wire sections at the downstream side thereof so that the joining mesh wires are not horizontal in areas where air flows through the support structure.

9. An aerosol separator according to claim 1, wherein another spray plane is disposed above the tube bundle which comprises a tube extending normally from the channel wall across the channel and forming one of a delta-shaped branch arrangement and an annular tube provided with nozzles for uniformly spraying liquid in upstream direction toward the tube bundle.

10. An aerosol separator according to claim 9, wherein the discharge openings of the gutter are arranged at the lowest point collecting areas of the gutter.

11. An aerosol separator according to claim 1, wherein with a large-volume tube bundle, the tube bundle comprises tube bundle segments.

* * * * *